Patented Mar. 6, 1928.

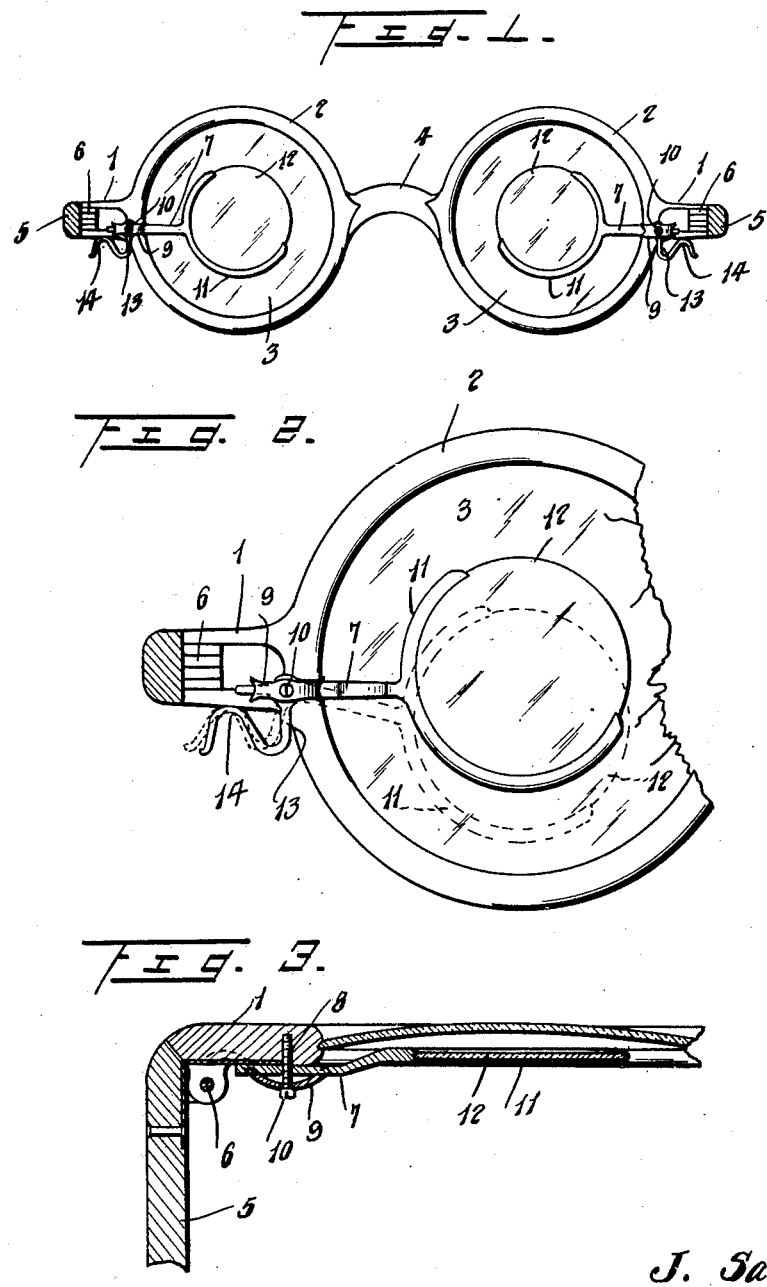

1,661,967

UNITED STATES PATENT OFFICE.

JOSEPH SAVOIE, OF CENTRAL FALLS, RHODE ISLAND.

AUXILIARY LENS ATTACHMENT FOR SPECTACLES.

Application filed February 9, 1926. Serial No. 87,048.

This invention relates to certain new and useful improvements in auxiliary lens attachments for spectacles, and has for one of its objects to provide an auxiliary lens to overlie the main lens and to be shifted to a remote position laterally of the main lens when out of use.

A further object of the invention is to provide an auxiliary lens attachment for spectacles wherein a pivotally supported arm carrying the auxiliary lens at one side of said pivotal mounting is provided with an integral curved wire extension at the other side of said mounting capable of being bent with respect to the mounting to cause the auxiliary lens to assume different positions with respect to the main lens.

A still further object of the invention is to provide an improved mounting for the auxiliary lens wherein an arcuate arm or holder being resilient and of channel formation, and extending over an arc slightly greater than 180° to permit the auxiliary lens to be easily and quickly mounted in the holder as well as disengaged therefrom.

With the above and other objects in view that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is an elevational view of a pair of spectacles with the side temples shown in section and illustrating the auxiliary lens attachment, Figure 2 is an enlarged fragmentary elevational view, partly in section of one side of the spectacle frame showing the auxiliary lens attachment with the auxiliary lens illustrated by full lines positioned centrally of the main lens and with a part of said holder for the auxiliary lens distorted or bent to permit the auxiliary lens to occupy a different position with respect to the main lens as illustrated by dotted lines, and Figure 3 is a fragmentary longitudinal sectional view of the spectacle part shown in Fig. 2.

Referring more in detail to the accompanying drawing, there is illustrated a pair of spectacles embodying a frame 1 carrying lens holders 2 for the main lens 3 and a nose bridge 4, the opposite ends of the frame 1 having temples 5 hinged thereto as at 6.

The auxiliary lens holder comprises an arm 7 having an opening therein for the free passage of the screw 8 that enters the spectacle frame 1 while a leaf spring 9 is interposed between the arm 7 and head 10 of the screw 8 to cause the arm 7 to frictionally engage the frame 1 for holding the arm in adjusted positions.

The end of the arm 7 that is directed toward the main lens 3 carries an arcuate head 11 for detachably holding the auxiliary lens 12, the head 11 being of channel formation and extending over a distance slightly greater than 180° so that the free ends thereof will be positioned beyond the median line of the auxiliary lens to resiliently clamp the latter in position. A slight pull upon the lens 12 will free the same from the head 11 whenever desired and the free ends of said head are forcibly separated by the auxiliary lens 12 during positioning thereof into the holder.

The spring 9 being associated with the screw 8 and arm 7 of the auxiliary lens holder, the lens 12 is retained in its adjusted position relative to the main lens 3, and to facilitate shifting movements of the auxiliary lens, a curved wire extension is carried by the arm 7 and embodies a right angularly directed section 13 in line with the pivotal mounting of the arm with a reversely curved portion 14 at the outer end of the section 13. The reversely curved portion of the wire engages the frame 1 as shown in Fig. 2 to limit movement of the auxiliary lens 12 in its movement over the face of the main lens 3 while the spring 9 retains the auxiliary lens in its adjusted position. As shown in Fig. 2, the lens 12 is positioned centrally of the lens 3, but should it be desired to position the lens 12 adjacent the lower end of the lens 3, the portion 14 of the wire is bent as shown by dotted lines so that when the wire engages the spectacle frame 1, the auxiliary lens will be disposed adjacent the lower end of the main lens. The wire section 14 may also be bent to cause the auxiliary lens 12 to occupy a position adjacent the upper side of the main lens 3 while the spring 9 retains the auxiliary lens holder in adjusted positions.

While there is herein shown and described the preferred embodiment of the present invention, it is, nevertheless, to be understood that minor changes may be made therein without departing from the spirit and scope of the invention as claimed.

What is claimed is:—

1. In an auxiliary lens holder for spectacles, the combination with a spectacle frame carrying conventional lenses, of an arm pivotally supported at its outer end on an outer side of the frame to swing in a plane parallel with and across one of the conventional lenses, an auxiliary lens carried by the inner free end of the arm, a spring associated with the arm for urging it into frictional contact with the frame at its pivot and holding the same in adjusted positions, and an operating member carried by the outer end of the arm and having a part movable into engagement with the spectacle frame for limiting downward swinging movement of the arm and the auxiliary lens carried thereby, said operating member being bendable relative to the arm to vary the limit of downward movement of the arm and the auxiliary lens carried thereby.

2. In an auxiliary lens holder for spectacles, the combination with a spectacle frame carrying conventional lenses, of an arm pivotally supported at its outer end on an outer side of the frame to swing in a plane parallel with and across one of the conventional lenses, an auxiliary lens carried by the inner free end of the arm, a spring associated with the arm for urging it into frictional contact with the frame at its pivot and holding the same in adjusted positions, an operating member carried by the outer end of the arm and having a part movable into engagement with the spectacle frame for limiting downward swinging movement of the arm and the auxiliary lens carried thereby, said operating member being bendable relative to the arm to vary the limit of downward movement of the arm and the auxiliary lens carried thereby, and comprising a reversely bent member.

3. In an auxiliary lens holder for spectacles, the combination with a spectacle frame carrying conventional lenses, of an arm pivotally supported at its outer end on an outer side of the frame to swing in a plane parallel with and across one of the conventional lenses, an auxiliary lens carried by the inner free end of the arm, a spring associated with the arm for urging it into frictional contact with the frame at its pivot and holding the same in adjusted positions, and a resilient arcuate head of channel formation rigid with the free inner end of the arm and removably carrying the auxiliary lens, said head being attached to the arm at a point nearer one end of the head than the other, whereby upward and inward movement of the auxiliary lens is required in removing it from the head.

In testimony whereof I affix my signature.

JOSEPH SAVOIE.